United States Patent
Hwang et al.

(10) Patent No.: US 10,252,698 B2
(45) Date of Patent: Apr. 9, 2019

(54) APPARATUS AND METHOD FOR DIAGNOSING FAILURE OF ULTRASONIC SENSOR

(71) Applicants: Hyundai Motor Company, Seoul (KR); Kia Motors Corporation, Seoul (KR); LS Automotive Technologies Co., Ltd., Anyang-si (KR)

(72) Inventors: Soon Cheol Hwang, Yongin-si (KR); Jee Hyun Jung, Anyang-si (KR); In Chul Hwang, Yongin-si (KR)

(73) Assignees: Hyundai Motor Company, Seoul (KR); Kia Motors Corporation, Seoul (KR); LS Automotive Technologies Co., Ltd., Anyang-si (KR)

( * ) Notice: Subject to any disclaimer, the term of this patent is extended or adjusted under 35 U.S.C. 154(b) by 0 days.

(21) Appl. No.: 15/801,230

(22) Filed: Nov. 1, 2017

(65) Prior Publication Data

US 2018/0326945 A1   Nov. 15, 2018

(30) Foreign Application Priority Data

May 11, 2017   (KR) ........................ 10-2017-0058784

(51) Int. Cl.
*G01S 15/93* (2006.01)
*B60R 25/10* (2013.01)
*G01S 13/56* (2006.01)
*G01S 7/52* (2006.01)

(52) U.S. Cl.
CPC ...... *B60R 25/1009* (2013.01); *G01S 7/52004* (2013.01); *G01S 13/56* (2013.01)

(58) Field of Classification Search
None
See application file for complete search history.

(56) References Cited

U.S. PATENT DOCUMENTS

| 4,922,224 A | * | 5/1990 | Drori ................ B60R 25/1004 340/426.25 |
| 5,497,775 A | * | 3/1996 | Nonaka ................ G01S 7/5205 600/438 |
| 6,198,385 B1 | | 3/2001 | Kani et al. |

(Continued)

FOREIGN PATENT DOCUMENTS

| JP | 2001-134850 A | 5/2001 |
| JP | 2007-093616 A | 4/2007 |

(Continued)

*Primary Examiner* — Brent Swarthout
(74) *Attorney, Agent, or Firm* — Morgan, Lewis & Bockius LLP (57) ABSTRACT

An apparatus and a method for diagnosing a failure of an ultrasonic detector in a manner that diagnoses whether a failure has occurred in the ultrasonic detector by determining whether a surge voltage is generated based on a waveform received by a receiver of the ultrasonic detector after activation of a transmitter of the ultrasonic sensor, may include an ultrasonic detector transmitting and receiving an ultrasonic wave; a voltage detector measuring a voltage of the received ultrasonic wave; and a controller determining whether a surge voltage is generated based on the measured voltage, and diagnosing whether a failure has occurred in the ultrasonic detector according to whether the surge voltage is generated.

16 Claims, 6 Drawing Sheets

(56) References Cited

U.S. PATENT DOCUMENTS

| | | |
|---|---|---|
| 7,030,741 B2 | 4/2006 | Sasaki |
| 9,610,921 B2 | 4/2017 | Kyung |
| 2003/0174052 A1 | 8/2003 | Oku et al. |
| 2005/0099271 A1 | 5/2005 | Sasaki |
| 2009/0207006 A1* | 8/2009 | Richter ............... G01S 7/52004 340/435 |
| 2015/0166010 A1 | 6/2015 | Kyung |

FOREIGN PATENT DOCUMENTS

| | | | |
|---|---|---|---|
| JP | 2008-250925 A | | 10/2008 |
| JP | 2009-040114 A | | 2/2009 |
| KR | 10-2003-0074749 A | | 9/2003 |
| KR | 10-1265468 B1 | | 5/2013 |

* cited by examiner

APPARATUS AND METHOD FOR DIAGNOSING FAILURE OF ULTRASONIC SENSOR

CROSS-REFERENCE(S) TO RELATED APPLICATIONS

The present application claims priority to Korean Patent Application No. 10-2017-0058784, filed on May 11, 2017, the entire contents of which is incorporated herein for all purposes by this reference.

BACKGROUND OF THE INVENTION

Field of the Invention

The present invention relates to an apparatus and a method for diagnosing a failure of an ultrasonic sensor, and, more particularly, to a technology for diagnosing a failure of an ultrasonic detector with high accuracy even in an environment where a reception waveform of the ultrasonic detector is changing (for example, in an internal of a vehicle) due to a convection phenomenon.

Description of Related Art

In general, an ultrasonic detector is a device configured to measure a distance to an object or detect the presence or absence of an obstacle by generating and outputting high frequency ultrasound waves of approximately 20 kHz or higher, and measuring a difference of time between the sound wave being generated and a received sound wave reflected from the object. The ultrasonic detector is typically applied to a variety of systems including a distance measurement system, an obstacle detection system, and a snowfall detection system.

The ultrasonic detector applies a voltage to a piezoelectric element connected to a trigger pin to generate ultrasonic waves, and receives the sound wave reflected from the object through an echo pin to generate another voltage.

According to the related art, a method for diagnosing a failure of an ultrasonic detector is configured to determine that the ultrasonic detector is normal when a voltage of a waveform received by a receiver of the ultrasonic detector after a transition of a transmitter of the ultrasonic detector from an OFF state to an ON state exceeds a reference value, and that a failure has occurred in the ultrasonic detector when the voltage does not exceed the reference value. Here, the failure diagnosis process may be performed within a predetermined time period (for example, 500 ms).

According to the related art, portions of the reception waveform of the ultrasonic detector may either exceed or not exceed the reference value in an environment where the reception waveform of the ultrasonic detector is changing due to a convection phenomenon, as in a commercial vehicle with a large internal volume, and thus it may be difficult to accurately diagnose whether a failure occurs in the ultrasonic sensor.

For example, in the related art method, although the ultrasonic detector is operating normal, when a portion of the reception waveform does not exceed the reference value due to the convection phenomenon, it may be determined that a failure occurs in the ultrasonic sensor. On the other hand, when a failure has actually occurred in the ultrasonic sensor, a portion of the reception waveform may exceed the reference value due to the convection phenomenon, and the ultrasonic detector may be diagnosed as normal.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus and a method for diagnosing a failure of an ultrasonic detector with high accuracy, even in an environment where a reception waveform of the ultrasonic detector is changing, in a manner that diagnoses whether the failure has occurred in the ultrasonic detector by determining whether a surge voltage is generated based on a waveform received by a receiver of the ultrasonic detector after activation of a transmitter of the ultrasonic sensor.

The object of the present invention is not limited to the foregoing object, and any other objects and advantages not mentioned herein will be clearly understood from the following description. The present inventive concept will be more clearly understood from exemplary embodiments of the present invention. In addition, it will be apparent that the objects and advantages of the present invention can be achieved by elements and features claimed in the appended claims and a combination thereof.

According to various aspects of the present invention, an apparatus for diagnosing a failure of an ultrasonic detector may include: an ultrasonic detector transmitting and receiving an ultrasonic wave; a voltage detector measuring a voltage of the received ultrasonic wave; and a controller configured to determine whether a surge voltage is generated based on the measured voltage, and diagnosing whether the failure has occurred in the ultrasonic detector according to whether the surge voltage is generated.

The controller may diagnose the ultrasonic detector as normal when the surge voltage is generated, and diagnose that a failure has occurred in the ultrasonic detector when no surge voltage is generated.

The controller may extract voltage values from the measured voltage at predetermined time intervals, determine an average value of the extracted voltage values after a predetermined time period has elapsed, add a tuning value to the determined average value to determine a threshold value, diagnose the ultrasonic detector as normal when at least one of the extracted voltage values exceeds the threshold value, and diagnose that a failure has occurred in the ultrasonic detector when none of the extracted voltage values exceed the threshold value.

The controller may be configured to control a storage which stores the extracted voltage values.

The controller may be configured determine whether the surge voltage is generated when a lock signal of a vehicle door is input.

The controller may be configured to control an output device which outputs a diagnosis result, either visually, audibly, or the like.

According to various aspects of the present invention, a method for diagnosing a failure of an ultrasonic detector may include steps of: transmitting and receiving, by an ultrasonic sensor, an ultrasonic wave; measuring, by a voltage sensor, a voltage of the received ultrasonic wave; and determining, by a controller, whether a surge voltage is generated based on the measured voltage, and diagnosing whether a failure has occurred in the ultrasonic detector according to whether the surge voltage is generated.

The diagnosing step may include diagnosing the ultrasonic detector as normal when the surge voltage is generated, and diagnosing that a failure has occurred in the ultrasonic detector when no surge voltage is generated.

The diagnosing step may include: extracting voltage values from the measured voltage at predetermined time intervals; determining an average value of the extracted voltage values after a predetermined time period has elapsed; determining a threshold value by adding a tuning value to the determined average value; diagnosing the ultrasonic detector as normal when at least one of the extracted voltage values exceeds the threshold value; and diagnosing that a failure has occurred in the ultrasonic detector when none of the extracted voltage values exceed the threshold value.

The diagnosing step may further include storing the extracted voltage values.

The diagnosing step may include determining whether the surge voltage is generated when a lock signal of a vehicle door is input.

According to various aspects of the present invention, an apparatus for diagnosing a failure of an ultrasonic detector may include: an ultrasonic detector including a receiver, a first transmitter, and a second transmitter; a voltage detector configured to measure a voltage of an ultrasonic wave received by the receiver; and a controller configured to activate the first transmitter in a first section and activate the first transmitter and the second transmitter in a second section, determine whether a surge voltage is generated based on a voltage measured in each section, and diagnose whether a failure has occurred in the first transmitter or the second transmitter according to whether the surge voltage is generated.

The controller may be configured to extract voltage values from the voltage measured in the first section at predetermined time intervals, determine a first average value of the extracted voltage values after a predetermined time period has elapsed in the first section, determine a first threshold value by adding a tuning value to the first average value, diagnose the first transmitter as normal when at least one of the extracted voltage values in the first section exceeds the first threshold value, and diagnose that a failure has occurred in the first transmitter when none of the extracted voltage values in the first section exceed the first threshold value.

The controller may be configured to extract voltage values from the voltage measured in the second section at predetermined time intervals when the first transmitter is considered normal, determine a second average value of the extracted voltage values after a predetermined time period has elapsed in the second section, determine a second threshold value by adding a tuning value to the second average value, diagnose the second transmitter as normal when at least one of the extracted voltage values in the second section exceeds the second threshold value, and diagnose that a failure has occurred in the second transmitter when none of the extracted voltage values in the second section exceed the second threshold value.

The controller may be configured to diagnose the ultrasonic detector as normal when a result of dividing the second average value by the first average value is disposed in a threshold range, and diagnose that a failure has occurred in the ultrasonic detector when the result is not included in the threshold range.

According to various aspects of the present invention, a method for diagnosing a failure of an ultrasonic detector including a receiver, a first transmitter, and a second transmitter, may include steps of: activating, by a controller, the first transmitter in a first section; measuring, by a voltage sensor, a first voltage of an ultrasonic wave received by the receiver in the first section; determining, by the controller, whether a surge voltage is generated based on the first voltage, and diagnosing whether a failure has occurred in the first transmitter according to whether the surge voltage is generated; activating, by the controller, the second transmitter in a second section while maintaining the activated state of the first transmitter when the first transmitter is considered normal; measuring, by the voltage sensor, a second voltage of an ultrasonic wave received by the receiver in the second section; and determining, by the controller, whether a surge voltage is generated based on the second voltage, and diagnosing whether a failure has occurred in the second transmitter according to whether the surge voltage is generated.

The step of diagnosing whether a failure has occurred in the first transmitter may include: extracting voltage values from the first voltage measured in the first section at predetermined time intervals; determining a first average value of the extracted voltage values after a predetermined time period has elapsed in the first section; determining a first threshold value by adding a tuning value to the first average value; diagnosing the first transmitter as normal when at least one of the extracted voltage values in the first section exceeds the first threshold value; and diagnosing that a failure has occurred in the first transmitter when none of the extracted voltage values in the first section exceed the first threshold value.

The step of diagnosing whether a failure has occurred in the second transmitter may include: extracting voltage values from the second voltage measured in the second section at predetermined time intervals; determining a second average value of the extracted voltage values after a predetermined time period has elapsed in the second section; determining a second threshold value by adding a tuning value to the second average value; diagnosing the second transmitter as normal when at least one of the extracted voltage values in the second section exceeds the second threshold value; and diagnosing that a failure has occurred in the second transmitter when none of the extracted voltage values in the second section exceed the second threshold value.

The method may further include diagnosing the ultrasonic detector as normal when a result of dividing the second average value by the first average value is disposed in a threshold range, and diagnosing that a failure has occurred in the ultrasonic detector when the result is not included in the threshold range.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included with in the spirit and scope of the invention as defined by the appended claims.

Terms including first, second, A, B, (a), and (b) may be used to describe the elements in exemplary embodiments of the present invention. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
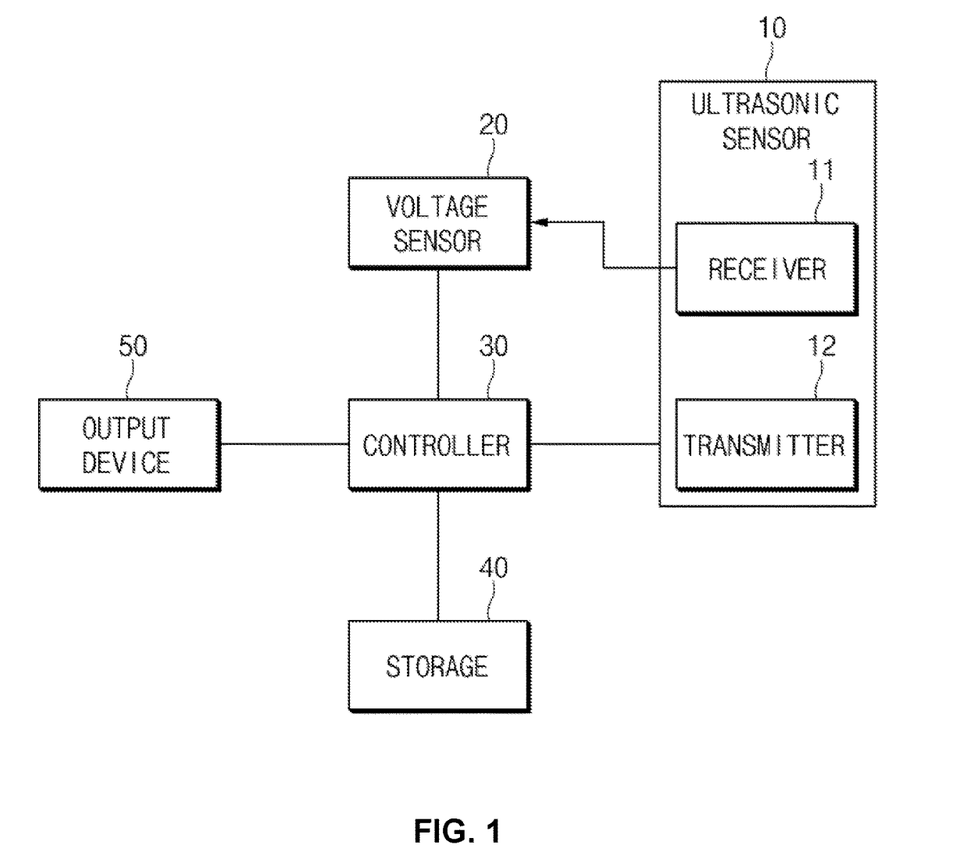
FIG. 1 illustrates a configuration of an apparatus for diagnosing a failure of an ultrasonic detector according to an exemplary embodiment of the present invention.

FIG. 1 illustrates the configuration of an apparatus for diagnosing a failure of an ultrasonic detector according to an exemplary embodiment of the present invention.

As illustrated in FIG. 1, the apparatus for diagnosing a failure of an ultrasonic sensor, according to an exemplary embodiment of the present invention, includes an ultrasonic detector 10, a voltage detector 20, a controller 30, a storage 40, and an output device 50.

With respect to each of the aforementioned elements, the ultrasonic detector 10 may, for example, be located in the internal of a vehicle and be applied to a system for detecting intrusion of an outsider into the vehicle. The ultrasonic detector 10 includes a transmitter 12 configured for transmitting ultrasonic waves and a receiver 11 configured for receiving ultrasonic waves reflected from an object and returning from among the ultrasonic waves transmitted by the transmitter 12.

The present inventive concept relates to a technology for diagnosing a failure of an ultrasonic sensor. All ultrasonic detectors may be subject to diagnosis, irrespective of kinds, specifications, and frequency characteristics.

The voltage detector 20 may measure a voltage of the ultrasonic wave (a reception waveform) received by the receiver 11. The measured voltage of the reception waveform is illustrated in FIG. 2.

Hereinafter, the reception waveform will be described with reference to FIG. 2.

Figure 2:
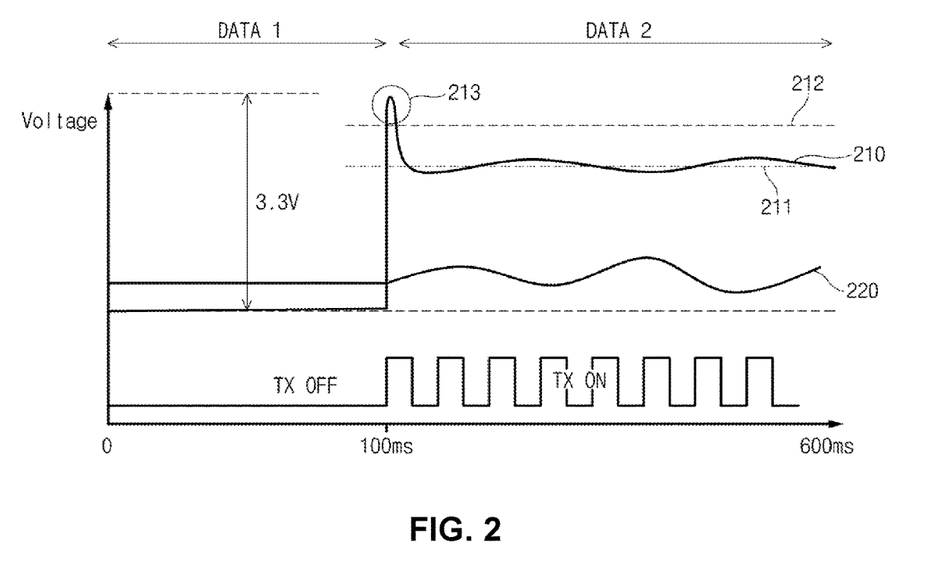
FIG. 2 illustrates a reception waveform of an ultrasonic detector according to an exemplary embodiment of the present invention.

In FIG. 2, reference numeral 210 denotes a reception waveform (hereinafter referred to as "the first reception waveform") when the ultrasonic detector 10 is in a normal state, and reference numeral 220 denotes a reception waveform (hereinafter referred to as "the second reception waveform") when a failure has occurred in the ultrasonic detector 10. Here, it can be seen that both the first reception waveform 210 and the second reception waveform 220 are changing with respect to time.

In the present case, when it is diagnosed whether or not a failure occurs in the ultrasonic detector 10 according to a conventional method, portions of the first reception waveform 210 and the second reception waveform 220 may either exceed or not exceed a reference value, and thus it may be difficult to diagnose the failure or non-failure of the ultrasonic detector 10 with high accuracy.

Referring to FIG. 2, it can be seen in the first reception waveform 210 that a surge voltage 213 is generated at a time of transition of the transmitter 12 from an OFF state to an ON state. However, there is no surge voltage in the second reception waveform 220.

On the basis of the above principle, the present inventive concept includes a diagnosis of failure of an ultrasonic detector by determining whether or not a surge voltage is generated based on a waveform received by the receiver of the ultrasonic detector after activation of the transmitter of the ultrasonic sensor. Here, a process for determining whether or not the surge voltage 213 is generated will be described in detail.

The controller 30 controls the aforementioned respective elements to perform the functions thereof normally. For example, the controller 30 may be configured to determine the activation timings of individual elements, i.e., the ultrasonic detector 10, the voltage detector 20, the storage 40, and the output device 50, independently, and perform a variety of controls (including a power control) required for activation. When receiving a lock signal of a vehicle door through an in-vehicle network, the controller 30 may activate the aforementioned respective elements and initiate the failure diagnosis process of the ultrasonic detector 10. Here, the in-vehicle network includes Controller Area Network (CAN), Local Interconnect Network (LIN), FlexRay, and Media Oriented Systems Transport (MOST).

The controller 30 may extract voltage values from the voltage of the reception waveform measured by the voltage detector 20 at predetermined time intervals (for example, every 4 ms). Here, the controller 30 may control the storage 40 to store the extracted voltage values.

Hereinafter, the process, by the controller 30, for diagnosing a failure of the ultrasonic detector 10 will be described with reference to FIG. 2. The first reception waveform 210 will be referred to as an example.

As described above, failure of the ultrasonic detector 10 may be diagnosed by determining whether or not the surge voltage 213 is generated.

To the present end, the controller 30 may determine an average value of the extracted voltage values after the first reception waveform 210 is stabilized, that is, after a predetermined time period has elapsed in a state in which the state of the transmitter 12 is changed from the OFF state to the ON state. In FIG. 2, reference numeral 211 denotes the determined average value of the first reception waveform 210.

In other words, the controller 30 may activate the transmitter 12, extract the voltage values from the voltage of the reception waveform measured by the voltage detector 20 at the predetermined time intervals, and determine the average value of the extracted voltage values after the predetermined time period has elapsed from the activation of the transmitter 12.

Next, the controller 30 may add a tuning value (for example, 0.16 V) to the determined average value to yield a threshold value. In FIG. 2, reference numeral 212 denotes the determined threshold value.

Thereafter, when at least one of the extracted voltage values exceeds the threshold value, the controller 30 may determine that the surge voltage 213 is generated, and diagnose the ultrasonic detector 10 as normal. However, when none of the extracted voltage values exceed the threshold value, the controller 30 may diagnose that a failure has occurred in the ultrasonic detector 10.

Such a failure diagnosis process of the ultrasonic detector 10 will be described by way of example.

When the failure diagnosis process is initiated a total of 25 voltage values may be extracted at a time interval of 4 ms for 100 ms as a ready state. The extracted 25 voltage values are referred to as "DATA1".

Next, a total of 125 voltage values may be extracted at a time interval of 4 ms for 500 ms initiated at an end of the ready state. The extracted 125 voltage values are referred to as "DATA2", which is actual data used for detecting whether or not a surge voltage is generated.

Thereafter, assuming that the stabilization time of the first reception waveform 210 is, for example, 8 ms, the number of data points used for determination of an average value is 123. Here, the stabilization time may be determined differently depending on a test environment.

As such, a threshold value may be determined by adding a tuning value to the average value of the 123 data points. When at least one of the 125 voltage values exceeds the threshold value, the ultrasonic detector 10 may be diagnosed as normal. On the other hand, when none of the 125 voltage values exceed the threshold value, it may be diagnosed as the occurrence of a failure in the ultrasonic detector 10.

Meanwhile, when a lock signal of a vehicle door is input from a body control module mounted in a vehicle, the controller 30 may initiate the failure diagnosis process of the ultrasonic detector 10.

The storage 40 may store a variety of data, voltage values having a time index under the control of the controller 30.

The output device 50 may output a diagnosis result under the control of the controller 30. For example, the output device 50 may be an alarm to output an alarm sound according to the diagnosis result, or may be a display device to display the diagnosis result.

Figure 6:
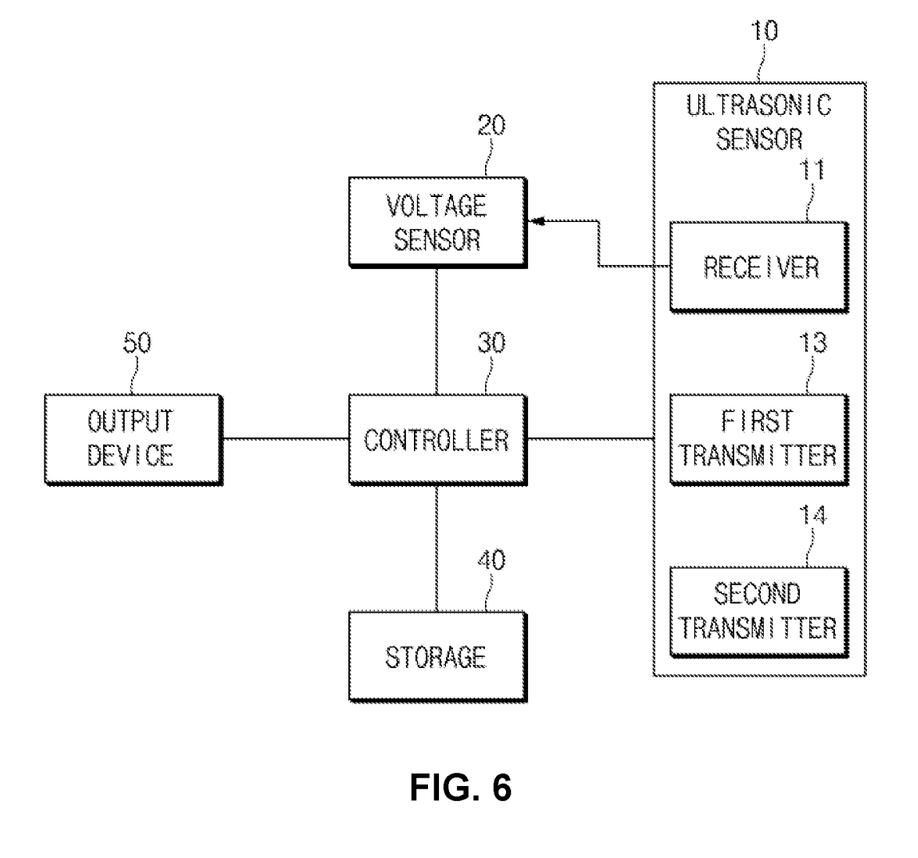
FIG. 6 illustrates a configuration of an apparatus for diagnosing a failure of an ultrasonic detector according to another exemplary embodiment of the present invention.

According to another exemplary embodiment, when the ultrasonic detector 10 includes a single receiver and a plurality of transmitters, a process for diagnosing a failure of the ultrasonic detector 10 will be described with reference to FIG. 3 and FIG. 6. In the present case, it may be determined which transmitter among the plurality of transmitters has failed.

Figure 3:
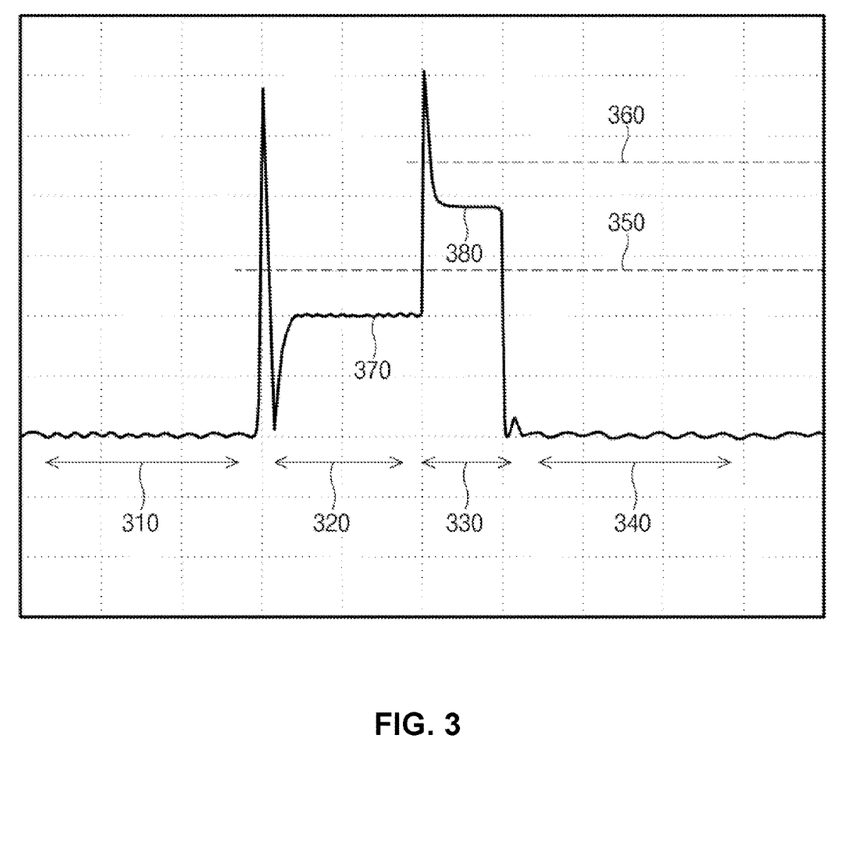
FIG. 3 illustrates a process for diagnosing a failure of an ultrasonic detector according to an exemplary embodiment of the present invention.

In FIG. 3, reference numeral 310 denotes a section where both a first transmitter 13 and a second transmitter 14 are in the OFF state, reference numeral "320" denotes a section where the first transmitter 13 is in an ON state and the second transmitter 14 is in the OFF state, reference numeral 330 denotes a section where both the first transmitter 13 and the second transmitter 14 are in the ON state, and reference numeral 340 denotes a section where both the first transmitter 13 and the second transmitter 14 are in the OFF state.

In addition, reference numeral 350 denotes a first threshold value, and "360" denotes a second threshold value.

In addition, reference numeral 370 denotes a waveform (hereinafter referred to as "the first reception waveform") received by the receiver 11 after the first transmitter 13 is activated, and reference numeral 380 denotes a waveform (hereinafter referred to as "the second reception waveform") received by the receiver 11 after the second transmitter 14 is activated in a state in which the first transmitter 13 remains in the activated state. In other words, reference numeral 380 denotes the waveform received by the receiver 11 in a state in which the first transmitter 13 and the second transmitter 14 are activated.

First of all, the controller 30 may maintain section 310, and change the state of the first transmitter 13 to the ON state to enter section 320.

As such, the voltage detector 20 may measure a voltage of the first reception waveform 370 received by the receiver 11.

Next, the controller 30 may extract voltage values from the voltage of the first reception waveform 370 measured by the voltage detector 20 after the activation of the first transmitter 13, at predetermined time intervals.

Thereafter, the controller 30 may determine a first average value using the extracted voltage values after a predetermined time period has elapsed from the activation of the first transmitter 13. The reason for doing the provided procedure is to consider the stabilization time of the first reception waveform 370.

As such, the controller 30 may add a tuning value (for example, 0.16 V) to the determined first average value to determine a first threshold value 350.

Thereafter, when at least one of the extracted voltage values after the activation of the first transmitter 13 exceeds the first threshold value 350, the controller 30 may determine that a surge voltage is generated, and diagnose the first transmitter 13 as normal. On the other hand, when none of the extracted voltage values exceed the first threshold value 350, the controller 30 may diagnose that a failure has occurred in the first transmitter 13.

As such, when the first transmitter 13 is considered normal, the controller 30 may activate the second transmitter 14 to enter section 330 while maintaining the activated state of the first transmitter 13.

Thereafter, the controller 30 may extract voltage values from the voltage of the second reception waveform 380 measured by the voltage detector 20 after the activation of the second transmitter 14, at predetermined time intervals.

As such, the controller 30 may determine a second average value using the extracted voltage values after a predetermined time period has elapsed from the activation of the second transmitter 14. The reason for doing the provided procedure is to consider the stabilization time of the second reception waveform 380.

Thereafter, the controller 30 may add a tuning value (for example, 0.16 V) to the determined second average value to determine a second threshold value 360.

As such, when at least one of the extracted voltage values after the activation of the second transmitter 14 exceeds the second threshold value 360, the controller 30 may determine that a surge voltage is generated, and diagnose the second transmitter 14 as normal. On the other hand, when none of the extracted voltage values exceed the second threshold value 360, the controller 30 may diagnose that a failure has occurred in the second transmitter 14.

Meanwhile, the controller 30 may diagnose the ultrasonic detector 10 as normal when a result of dividing the second average value by the first average value is disposed in a threshold range (for example, 1.9-2.1), and diagnose that a failure has occurred in the ultrasonic detector 10 when the result is not included in the threshold range.

Figure 4:
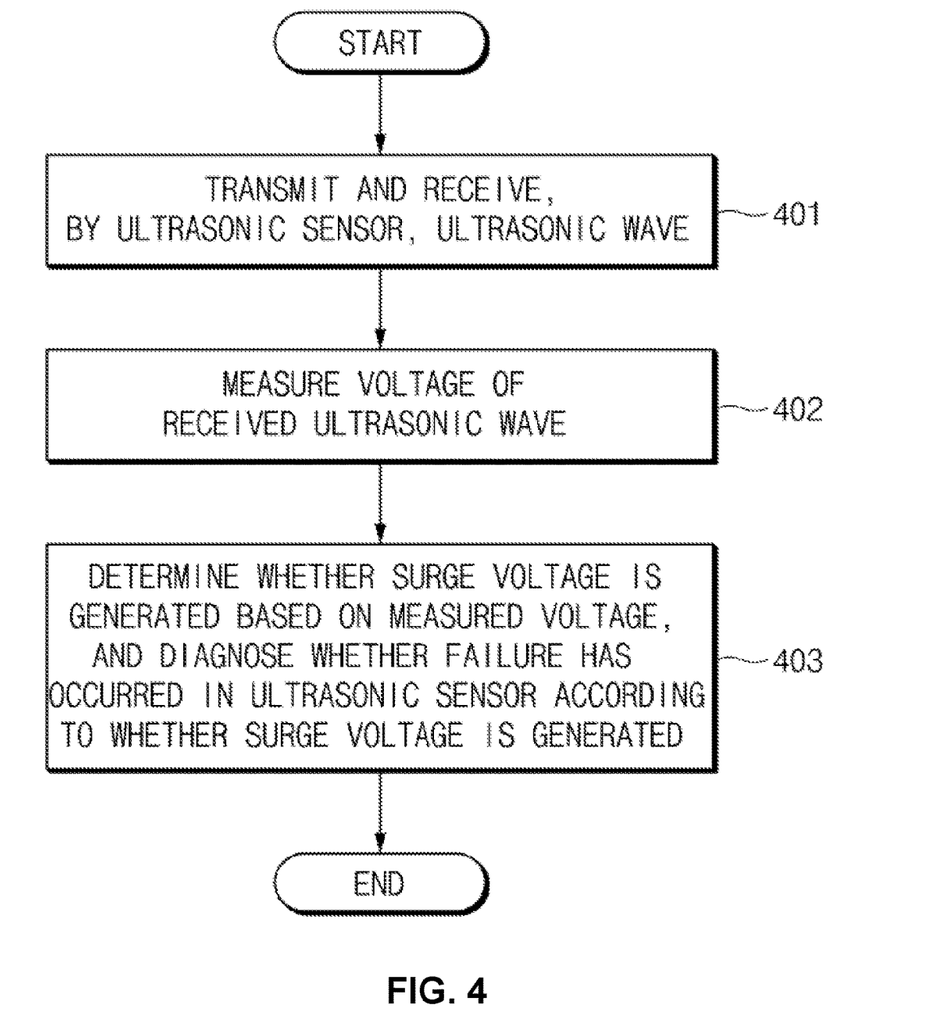
FIG. 4 illustrates a flowchart of a method for diagnosing a failure of an ultrasonic detector according to an exemplary embodiment of the present invention.

FIG. 4 illustrates a flowchart of a method for diagnosing a failure of an ultrasonic sensor, according to an exemplary embodiment of the present invention.

First of all, the ultrasonic detector 10 may transmit and receive an ultrasonic wave (401).

Next, the voltage detector 20 may measure a voltage of the received ultrasonic wave (402).

As such, the controller 30 may determine whether a surge voltage is generated based on the measured voltage, and diagnose whether a failure has occurred in the ultrasonic detector according to whether the surge voltage is generated (403).

Figure 5:
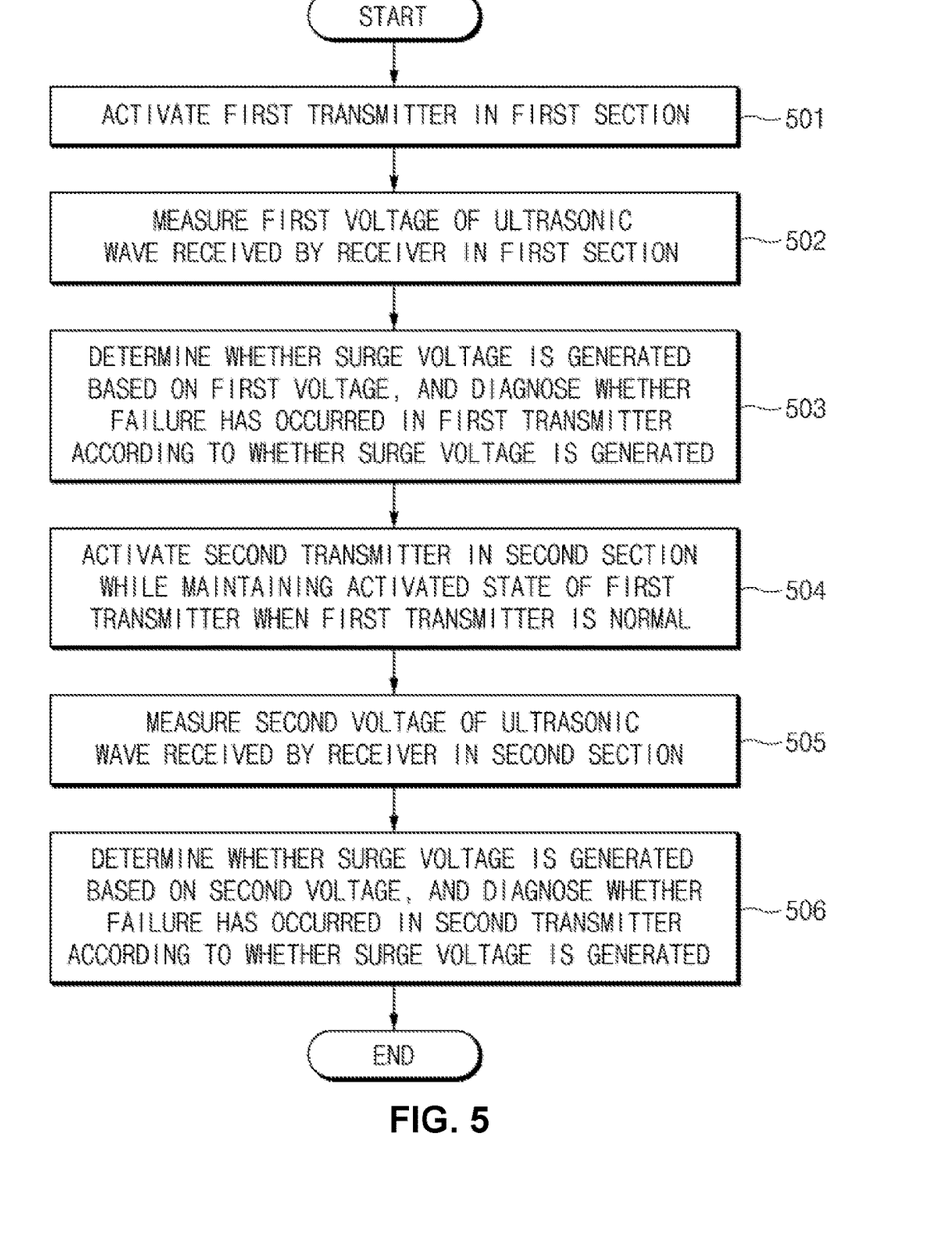
FIG. 5 illustrates a flowchart of a method for diagnosing a failure of an ultrasonic detector according to another exemplary embodiment of the present invention.

FIG. 5 illustrates a flowchart of a method for diagnosing a failure of an ultrasonic sensor, according to another exemplary embodiment of the present invention.

First of all, the controller 30 may activate the first transmitter 13 in a first section (501).

Next, the voltage detector 20 may measure a first voltage of an ultrasonic wave received by the receiver 11 in the first section (502).

Thereafter, the controller 30 may determine whether a surge voltage is generated based on the first voltage, and diagnose whether a failure has occurred in the first transmitter 13 according to whether the surge voltage is generated (503).

As such, when the first transmitter 13 is considered normal, the controller 30 may activate the second transmitter 14 in a second section while maintaining the activated state of the first transmitter 13 (504).

Thereafter, the voltage detector 20 may measure a second voltage of an ultrasonic wave received by the receiver 11 in the second section (505).

As such, the controller 30 may determine whether a surge voltage is generated based on the second voltage, and diagnose whether a failure has occurred in the second transmitter 14 according to whether the surge voltage is generated (506).

As set forth above, the apparatus and the method according to exemplary embodiments of the present invention may provide the effect of diagnosing a failure of an ultrasonic detector with high accuracy, even in an environment where a reception waveform of the ultrasonic detector is changing, in a manner that diagnoses whether a failure has occurred in the ultrasonic detector by determining whether a surge voltage is generated based on a waveform received by a receiver of the ultrasonic detector after activation of a transmitter of the ultrasonic sensor.

In addition, the present inventive concept may be applied to an intrusion protection system provided in a vehicle, wherein the intrusion of an outsider into the vehicle may be detected with high accuracy.

In addition, according to exemplary embodiments of the present invention, it may be diagnosed whether a failure has occurred in an ultrasonic detector including a plurality of transmitters and a single receiver, as well as an ultrasonic detector including a single transmitter and a single receiver.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustrative and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for diagnosing a failure of an ultrasonic detector, the apparatus comprising:
    the ultrasonic detector transmitting and receiving an ultrasonic wave;
    a voltage detector measuring a voltage of the received ultrasonic wave; and
    a controller configured for determining whether a surge voltage is generated based on the measured voltage, and diagnosing whether the failure has occurred in the ultrasonic detector according to whether the surge voltage is generated,
    wherein the controller is configured to extract voltage values from the measured voltage at predetermined time intervals, determine an average value of the extracted voltage values after a predetermined time period has elapsed, add a tuning value to the determined average value to determine a threshold value, diagnose the ultrasonic detector as normal when at least one of the extracted voltage values exceeds the threshold value, and diagnose that the failure has occurred in the ultrasonic detector when none of the extracted voltage values exceed the threshold value.

2. The apparatus according to claim 1, wherein the controller is configured to diagnose the ultrasonic detector as normal when the surge voltage is generated, and diagnose that the failure has occurred in the ultrasonic detector when no surge voltage is generated.

3. The apparatus according to claim 1, wherein the controller is configured to control a storage to store the extracted voltage values.

4. The apparatus according to claim 1, wherein the controller is configured to determine whether the surge voltage is generated when a lock signal of a vehicle door is input.

5. The apparatus according to claim 1, wherein the controller is configured to control an output device to output a diagnosis result.

6. A method for diagnosing a failure of an ultrasonic detector, the method comprising steps of:
   transmitting and receiving, by an ultrasonic detector, an ultrasonic wave;
   measuring, by a voltage detector, a voltage of the received ultrasonic wave; and
   determining, by a controller, whether a surge voltage is generated based on the measured voltage, and diagnosing whether the failure has occurred in the ultrasonic detector according to whether the surge voltage is generated,
   wherein the diagnosing step includes:
   extracting voltage values from the measured voltage at predetermined time intervals;
   determining an average value of the extracted voltage values after a predetermined time period has elapsed;
   determining a threshold value by adding a tuning value to the determined average value;
   diagnosing the ultrasonic detector as normal when at least one of the extracted voltage values exceeds the threshold value; and
   diagnosing that the failure has occurred in the ultrasonic detector when none of the extracted voltage values exceed the threshold value.

7. The method according to claim 6, wherein the diagnosing step includes diagnosing the ultrasonic detector as normal when the surge voltage is generated, and diagnosing that the failure has occurred in the ultrasonic detector when no surge voltage is generated.

8. The method according to claim 6, wherein the diagnosing step further includes storing the extracted voltage values.

9. The method according to claim 6, wherein the diagnosing step includes determining whether the surge voltage is generated when a lock signal of a vehicle door is input.

10. The method according to claim 6, further including outputting a diagnosis result.

11. An apparatus for diagnosing a failure of an ultrasonic detector, the apparatus comprising:
    an ultrasonic detector including a receiver, a first transmitter, and a second transmitter;
    a voltage detector measuring a voltage of an ultrasonic wave received by the receiver; and
    a controller configured for activating the first transmitter in a first section and activating the first transmitter and the second transmitter in a second section, determining whether a surge voltage is generated based on a voltage measured in each section, and diagnosing whether a failure has occurred in the first transmitter or the second transmitter according to whether the surge voltage is generated,
    wherein the controller is configured to extract voltage values from the voltage measured in the first section at predetermined time intervals, determine a first average value of the extracted voltage values after a predetermined time period has elapsed in the first section, determine a first threshold value by adding a tuning value to the first average value, diagnose the first transmitter as normal when at least one of the extracted voltage values in the first section exceeds the first threshold value, and diagnose that the failure has occurred in the first transmitter when none of the extracted voltage values in the first section exceed the first threshold value.

12. The apparatus according to claim 11, wherein the controller is configured to extract voltage values from the voltage measured in the second section at predetermined time intervals when the first transmitter is considered normal, determine a second average value of the extracted voltage values after a predetermined time period has elapsed in the second section, determine a second threshold value by adding a tuning value to the second average value, diagnose the second transmitter as normal when at least one of the extracted voltage values in the second section exceeds the second threshold value, and diagnose that a failure has occurred in the second transmitter when none of the extracted voltage values in the second section exceed the second threshold value.

13. The apparatus according to claim 12, wherein the controller is configured to diagnose the ultrasonic detector as normal when a result of dividing the second average value by the first average value is disposed in a threshold range, and diagnoses that the failure has occurred in the ultrasonic detector when the result is not included in the threshold range.

14. A method for diagnosing a failure of an ultrasonic detector including a receiver, a first transmitter, and a second transmitter, the method comprising steps of:
    activating, by a controller, the first transmitter in a first section;
    measuring, by a voltage detector, a first voltage of an ultrasonic wave received by the receiver in the first section;
    determining, by the controller, whether a surge voltage is generated based on the first voltage, and diagnosing whether a failure has occurred in the first transmitter according to whether the surge voltage is generated;
    activating, by the controller, the second transmitter in a second section while maintaining the activated state of the first transmitter when the first transmitter is considered normal;
    measuring, by the voltage detector, a second voltage of an ultrasonic wave received by the receiver in the second section; and
    determining, by the controller, whether a surge voltage is generated based on the second voltage, and diagnosing whether a failure has occurred in the second transmitter according to whether the surge voltage is generated,
    wherein the step of diagnosing whether the failure has occurred in the first transmitter includes:
    extracting voltage values from the first voltage measured in the first section at predetermined time intervals;
    determining a first average value of the extracted voltage values after a predetermined time period has elapsed in the first section;
    determining a first threshold value by adding a tuning value to the first average value:
    diagnosing the first transmitter as normal when at least one of the extracted voltage values in the first section exceeds the first threshold value; and
    diagnosing that the failure has occurred in the first transmitter when none of the extracted voltage values in the first section exceed the first threshold.

15. The method according to claim 14, wherein the step of diagnosing whether the failure has occurred in the second transmitter includes:
    extracting voltage values from the second voltage measured in the second section at predetermined time intervals;

determining a second average value of the extracted voltage values after a predetermined time period has elapsed in the second section;

determining a second threshold value by adding a tuning value to the second average value;

diagnosing the second transmitter as normal when at least one of the extracted voltage values in the second section exceeds the second threshold value; and diagnosing that the failure has occurred in the second transmitter when none of the extracted voltage values in the second section exceed the second threshold value.

16. The method according to claim 15, further including diagnosing the ultrasonic detector as normal when a result of dividing the second average value by the first average value is disposed in a threshold range, and diagnosing that a failure has occurred in the ultrasonic detector when the result is not included in the threshold range.

* * * * *